United States Patent [19]

Mello et al.

[11] Patent Number: 4,830,261

[45] Date of Patent: May 16, 1989

[54] EDDY CURRENT TOOL POSITIONING SYSTEM

[75] Inventors: Mark D. Mello, Providence; Steven C. Iemma, N. Scituate; Ray M. Hill, Smithfield; Charles W. Miller, Jr., Johnston; Louis G. Blais; Carl E. Andersen, both of N. Providence; J. Terence Feeley, Saunderstown, all of R.I.

[73] Assignee: Laser Limited, Inc., Smithfield, R.I.

[21] Appl. No.: 114,619

[22] Filed: Oct. 29, 1987

[51] Int. Cl.⁴ .................. B23K 26/04; B23K 26/08
[52] U.S. Cl. .................. 228/102; 228/103; 228/7; 228/12; 228/45; 219/124.34; 219/121.78; 219/121.79; 73/DIG. 3; 318/576
[58] Field of Search .................. 228/102, 103, 7, 12, 228/45; 219/124.34, 121.28, 121.78, 121.79; 318/576, 653; 408/13; 73/DIG. 3

[56] References Cited

U.S. PATENT DOCUMENTS

| | | | |
|---|---|---|---|
| 4,124,792 | 11/1978 | Flora et al. | 219/124.34 |
| 4,441,010 | 4/1984 | Cornu et al. | 219/124.34 |
| 4,513,195 | 4/1985 | Detriche | 318/576 |
| 4,567,345 | 1/1986 | Bachet et al. | 219/121 PT |
| 4,571,479 | 2/1986 | Maeda et al. | 318/576 |
| 4,642,447 | 2/1987 | Détriché | 219/125.1 |

FOREIGN PATENT DOCUMENTS

| | | | |
|---|---|---|---|
| 2507310 | 12/1982 | France | 228/102 |
| 14469 | 1/1982 | Japan | 219/124.34 |
| 206592 | 12/1982 | Japan | 228/103 |
| 61569 | 4/1984 | Japan | 219/124.34 |
| 56485 | 4/1985 | Japan | 219/124.34 |
| 96368 | 5/1985 | Japan | 219/124.34 |

Primary Examiner—Nicholas P. Godici
Assistant Examiner—Samuel M. Heinrich
Attorney, Agent, or Firm—Perman & Green

[57] ABSTRACT

A tool positioning system comprises a discontinuity detection means, such as an eddy current system, for detecting a discontinuity within a workpiece resulting from a joint between a first piece of material relative to a second piece of material, the discontinuity being detected from the back side of the second piece of material. The discontinuity is detected at a plurality of points by translating an eddy current probe over the back side of the second piece of material, the individual points thereafter being utilized to compute line elements that define the joint between the first and second pieces of material in a continuous fashion over the surface of the second piece of material. Thereafter a tool, such as a laser welding tool, is guided along the computed position along the backside of the second piece of material such that the first and second pieces of material are welded together along the joint.

23 Claims, 5 Drawing Sheets

EDDY CURRENT TOOL POSITIONING SYSTEM

FIELD OF THE INVENTION

The present invention relates to tool positioning systems and, in particular, relates to a method and apparatus for controllably positioning a tool relative to a surface of a workpiece having a discontinuity therein.

BACKGROUND OF THE INVENTION

Systems for integrally joining two pieces of material, such as sheet metal pieces, are known in the art. One such type of system is a welding system which may employ a laser beam or some other source of thermal energy for welding a first piece of stock to a second piece of stock. In such a system the movement of the tool may be automatically controlled by the system itself. That is, the coordinates of the two pieces of sheet material relative to local system coordinate axes may be programmed into the system, the system thereafter controlling the movement of the tool in accordance with the stored coordinates.

A problem that arises when a first piece of sheet material is oriented in a substantially perpendicular manner to a top surface of a second, supporting, piece of sheet material is that, due to the shape or dimensions of the material, the placement of the tool adjacent to the area to be welded may be extremely difficult or impossible to accomplish. In order to successfully join two such pieces of material it may be necessary to weld the perpendicularly disposed first piece to the supporting piece by applying heat to a back surface of the supporting piece. In order to accomplish a weld, the welding tool should be applied to the supporting piece opposite the joint between the first and the second pieces. As can be appreciated, if the vertically oriented piece has an irregular shape, such as a meandering or an undulating shape, the programming and subsequent positioning of the welding tool is made extremely difficult.

This problem of positioning is compounded by the requirement that the welding tool and the workpieces may be in motion relative one to another during the welding process. Furthermore, any misregistration between the welding tool and the joint to be welded may result in a blow through occurring in the supporting material, that is, the heat from the welding tool may burn a hole through the supporting piece of material if the tool is misaligned with the first piece of material. Such a hole may prove detrimental to the structural integrity of the workpiece and may result in the workpiece being unusable for its intended purpose. Even if a blow through does not occur, the resulting weld may be a cold weld.

It is thus one object of the present invention to provide a method and an apparatus for positioning a tool relative to a workpiece.

It is a further object of the present invention to provide for the positioning of a welding tool relative to a workpiece having a discontinuity defined by a joint between a first and a second piece of material which are desired to be joined together.

It is a further objective of the present invention to provide for the accurate alignment and positioning of a welding tool for joining a first and a second piece of thin sheet-like metal stock when the first piece of stock is orientated substantially perpendicularly to the second piece of stock.

It is still one further object of the present invention to provide for positioning a welding tool adjacent to a surface of a supporting piece of sheet metal stock opposite that of a joint between the supporting stock and a second piece of stock which is desired to be welded to the first piece of stock.

SUMMARY OF THE INVENTION

The foregoing and other objects are realized by a tool positioning system which, in accordance with the methods and apparatus of the invention, comprises discontinuity detection means for detecting a discontinuity within a workpiece resulting from a joint between a first piece of material relative to a second piece of material, the discontinuity being detected from the back side of the second piece of material. The discontinuity is detected at a plurality of points, the individual points thereafter being utilized to compute line elements that define the joint between the first and second pieces of material in a continuous fashion over the surface of the second piece of material. Thereafter a tool, such as a laser welding tool, is guided along the computed position along the backside of the second piece of material such that the first and second pieces of material are welded together along the joint.

In accordance with an illustrative embodiment of the invention there is disclosed apparatus for positioning a tool relative to a workpiece comprising means for controllably positioning an eddy current detection means relative to a workpiece, the workpiece having a discontinuity detectable by the eddy current detection means; means for moving the detection means relative to the workpiece such that the detection means intersects the discontinuity at a plurality of points for producing an output signal from the detection means at each of the points; means for determining a position of the discontinuity coupled to the detection means and responsive to the detection means output signal; and means for controllably positioning a tool relative to the discontinuity being responsive to the said position determining means.

In accordance with one method of the invention there is disclosed a method for positioning a tool relative to a workpiece comprising the steps of controllably positioning an eddy current detection means relative to a workpiece, the workpiece having a discontinuity detectable by the eddy current detection means; moving the detection means relative to the workpiece such that the detection means intersects the discontinuity at a plurality of points for producing an output signal from the detection means at each of the points; determining a position of the discontinuity from the detection means output signals; and controllably positioning a tool relative to the determined position of the discontinuity.

BRIEF DESCRIPTION OF THE DRAWINGS

These and other aspects of the invention will be fully described hereinafter in reference to the drawings wherein:

FIG. 1A shows a portion of the workpiece of FIG. 1;

DETAILED DESCRIPTION OF THE INVENTION

The tool positioning method and apparatus of the invention may be advantageously employed in a number of different types of material processing systems. Although a preferred embodiment of the invention will be described below in reference to a welding system which employs a laser beam for welding two pieces of material together, it should be realized that the use of the invention is not limited to such laser welding systems but may be employed in electrical arc and electron beam welding systems and other types of welding systems. Similarly, the use of the invention may be advantageously employed in other than welding systems, such as in material cutting systems, milling systems and other types of systems wherein it is desirable to detect the position of a joint between two elements of a workpiece. Thus, the use of the invention should not be considered to be limited to a laser welding and positioning system as will be described hereinafter.

In order to gain an understanding of the method and apparatus of the invention it may first prove useful to describe the nature of the structure which the system may be employed to weld.

Figure 1:
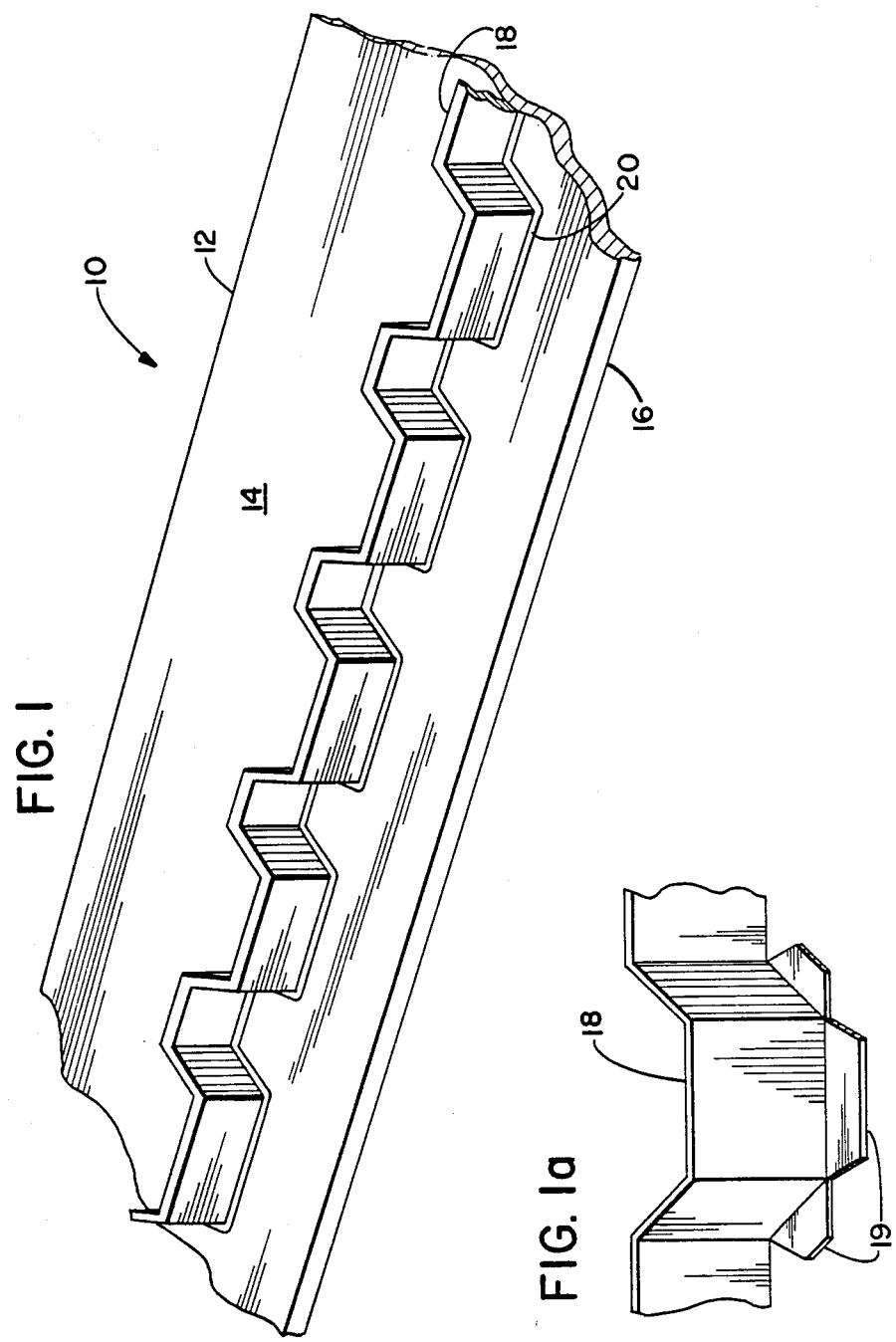
FIG. 1 shows an elevational view of a representative workpiece which may be operated on by the invention.

Referring first to FIG. 1, there is shown a workpiece 10 which is comprised of a substantially horizontally planar supporting member 12 having an upper surface 14 and a bottom surface 16. Joined to the upper surface 14 is a substantially vertically disposed second member 18 which may have an undulating shape as illustrated.

The supporting member 12 may be joined to the upstanding member 18 by a continuous hermetic weld 20. It can be appreciated that the supporting member 12 may have a plurality of such upstanding members 18 disposed across the surface thereof, it being realized that only one such upstanding member 18 is shown in FIG. 1.

The dimensions of the workpiece 10 in conjunction with the corrugated, undulating shape of the upstanding member 18 may prevent the accurate positioning of a welding tool adjacent to the area to be welded. Thus, it may be desirable to weld the members 12 and 18 together by applying heat to the back surface 16 of the member 12. However, in order to weld the two members together it is also desirable that the welding tool track the joint between the members 12 and 18 in an accurate manner from the back surface 16. If the welding tool is, for example, a laser beam any misregistration between the beam and the joint between the two pieces may result in an overheating of the supporting member 12 with the result of a blow through or a hole being burned through the member 12. Such an occurrence is obviously undesirable and may result in the spoilage of the workpiece. Even if such a blow through does not occur, insufficient heat may be applied to the joint, resulting in a cold weld.

Although the workpiece 10 is shown in FIG. 1 to be substantially planar it should be realized that only a small section of the workpiece 10 is shown. The workpiece 10 may have a conical annular form with the upstanding member being disposed about the inner circumference of the workpiece upon an inner surface thereof. It should also be realized that a second annular member (not shown) may thereafter be similarly welded to the top edge of the upstanding member 18 thereby providing a "sandwiched" type of construction. It may be desirable in some applications to provide the member 18 with a plurality of flanges 19, as shown in FIG. 1A, in order to increase the total surface area in contact with the supporting member 12, thereby increasing the strength of the weld.

Inasmuch as the welding tool must make a number of precise movements in order to accurately track the junction between the first and second members, the welding tool may be controlled by a computer coupled to a multi-axis positioning system, such as a system having a tool having three or more degrees of freedom. In general, such systems are characterized by a control, or host, computer which has stored within a memory a list comprised of sets of coordinates relating to the tool and the workpiece. The host computer accesses the list of coordinates and positions the tool in a sequential manner at each set of coordinates, thereby causing the tool to execute movements which are predetermined by the stored list of coordinates. One such system is a CNC system which is well known in the art and will not hereinafter be described in detail.

As can be appreciated in the use of such a system, an essential step in the utilization of the system is the generation of the list of coordinates from which the tool will be guided.

Figure 2:
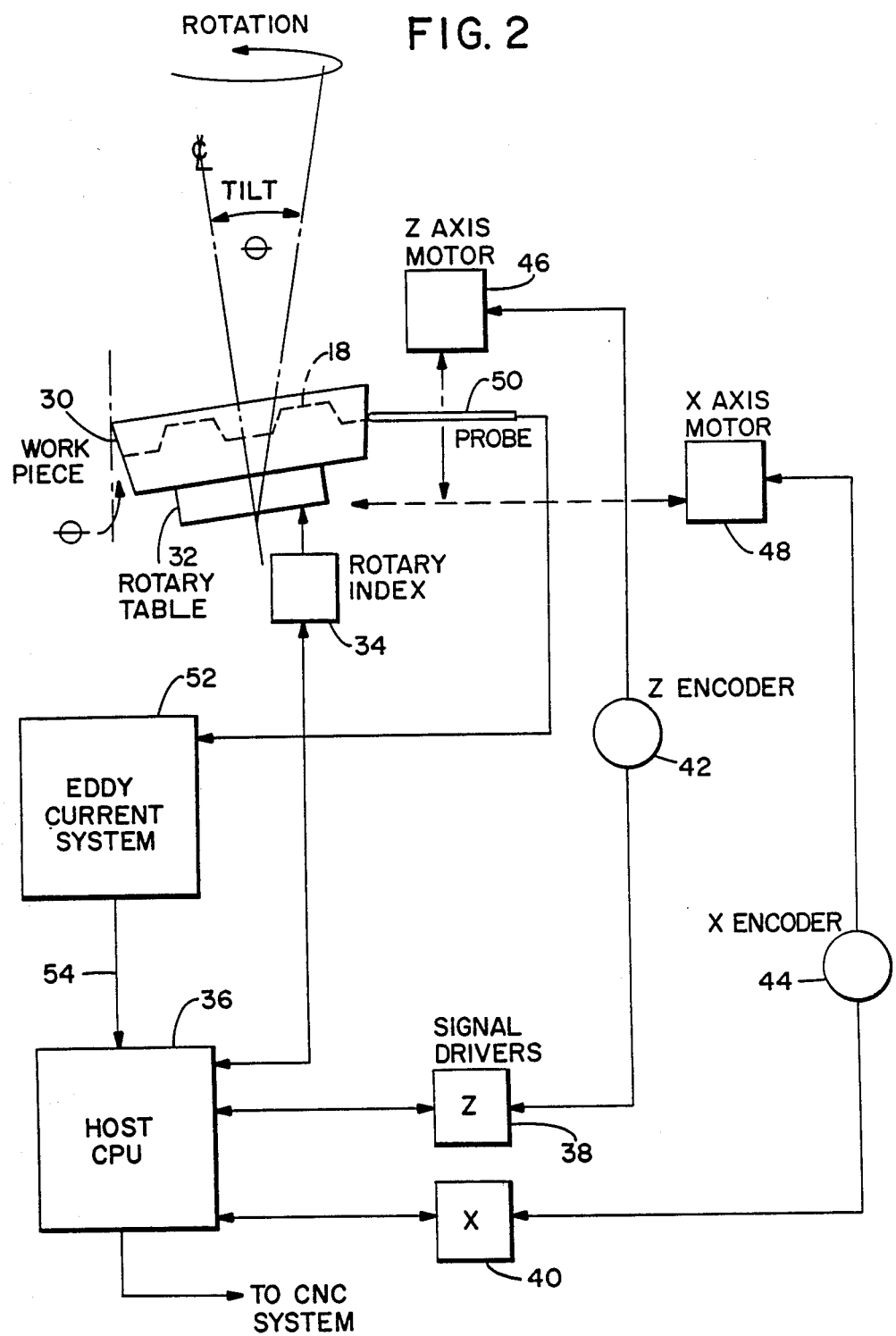
FIG. 2 is a block diagram showing the tool positioning apparatus of the invention in conjunction with a multi-axis tool positioning system.

Referring now to FIG. 2 there is shown in block diagram form a system which, in accordance with a method and apparatus of the invention, generates a plurality of positional information points for determining the coordinates of a joint associated with a workpiece.

A workpiece 30 has the shape of a conical annular section having a taper angle of theta. The outer surface of the workpiece 30 shown in FIG. 2 may be the bottom surface 16 of the supporting member 12 of FIG. 1. Shown in dotted outline on the workpiece 30 can be seen the bottom edge of the upstanding member 18 of FIG. 1 which is disposed in a continuous fashion about the circumference of the inner surface of workpiece 30. The workpiece 30 is mounted on a rotary table 32 which is controlled by a rotary index 34 which is operable for controllably rotating, or indexing, the table and the attached workpiece by incremental steps. A host computer or CPU 36 is coupled to the rotary index for activating the rotary index to rotate the table 32 and also to receive information from the index 34 relating to the number of steps that the rotary table 32 has been rotated. CPU 36 is also coupled to Z axis and X axis signal drivers 38 and 40, respectively, which are further coupled to Z axis and X axis drive motors 46 and 48, respectively. The system also includes a Z axis position encoder 42 and an X axis position encoder 44, each of which has an output signal coupled to CPU 36 for informing CPU 36 of the position of the tool along a given axis. Mechanically coupled to the Z axis motor is, in accordance with the invention, a discontinuity detection means, such as an eddy current probe 50, which is electrically coupled to an eddy current system 52. Although the invention will be described below in relation to such an eddy current system it should be realized that the invention may be practiced with a number of different types of discontinuity detecting means. For example, the discontinuity detection means may be an X-ray, piezoelectric, NMR or an ultrasound means. Therefore, the invention is not meant to be limited to only an eddy current discontinuity detecting means.

The eddy current probe 50 operates in a conventional manner by generating a frequency or frequencies which penetrate the surface of the workpiece. A discontinuity in the workpiece material, such as the discontinuity caused by the joint between the upstanding member 18 and the surface 14 of the supporting member 12, results in the probe generating an output signal which is detected by the eddy current system 52. In order to generate this signal the probe 50 is moved, in accordance with the invention, in a controlled manner by the Z axis motor in an up and down fashion along the Z axis of the system. As the probe is translated in this up and down fashion along the Z axis the workpiece 30 is rotated by table 32 about an axis of rotation such that the outer surface of the workpiece passes under the probe. Each time the probe passes over the discontinuity resulting from the joint between the upstanding member 18 and the inner surface 14 of the workpiece 30 a signal is generated which is detected by the eddy current system 52. The eddy current system 52 has an output signal 54 which is also coupled to the host CPU 36. Inasmuch as the host CPU 36 is apprised of the rotary position of the workpiece 30 and also the position of the probe 50 in the Z axis, due to the operation of the Z axis encoder 42, each time that the signal 54 is received by the host CPU 36 the host CPU 36 is enabled to determine and record the coordinates of the probe 50 relative to the X, Z and rotational positions. Of course, these coordinates are also indicative of the coordinates of the joint between the upstanding member 18 relative to the surface 14.

In accordance with an algorithm which will be described hereinafter, the host CPU 36 translates each discontinuity signal received from eddy current system 52 into X, Y, Z and rotational coordinates which are thereafter downloaded to a CNC system. At a time subsequent to the CPU 36 determining the coordinates the eddy current probe 50 may be removed from the system and a welding tool, such as a laser beam, may be inserted in its place. The position of the welding tool is thereafter controlled by the coordinates stored within the CNC system. The probe 50 may be either physically removed from the system or, preferably, the rotary table 32 may be translated along the system Y axis to a position where the welding tool is attached to another Z axis translational means. Inasmuch as the rotary table 32 is translated only along the Y axis, the X and Z coordinates remain unaffected. To compensate for the movement of the workpiece in the Y axis a Y coordinate compensation factor may be applied to the set of Y coordinates previously determined.

In FIG. 2 the rotary table is shown tilted at an angle theta such that the probe is orientated substantially perpendicularly to the outer wall of the workpiece 30. This perpendicular alignment of the probe 50 is preferable to accurately track the position of the member 18. Of course, if the workpiece is not of an annular conical shape and has vertical side walls such a tilt may be unnecessary.

Figure 3:
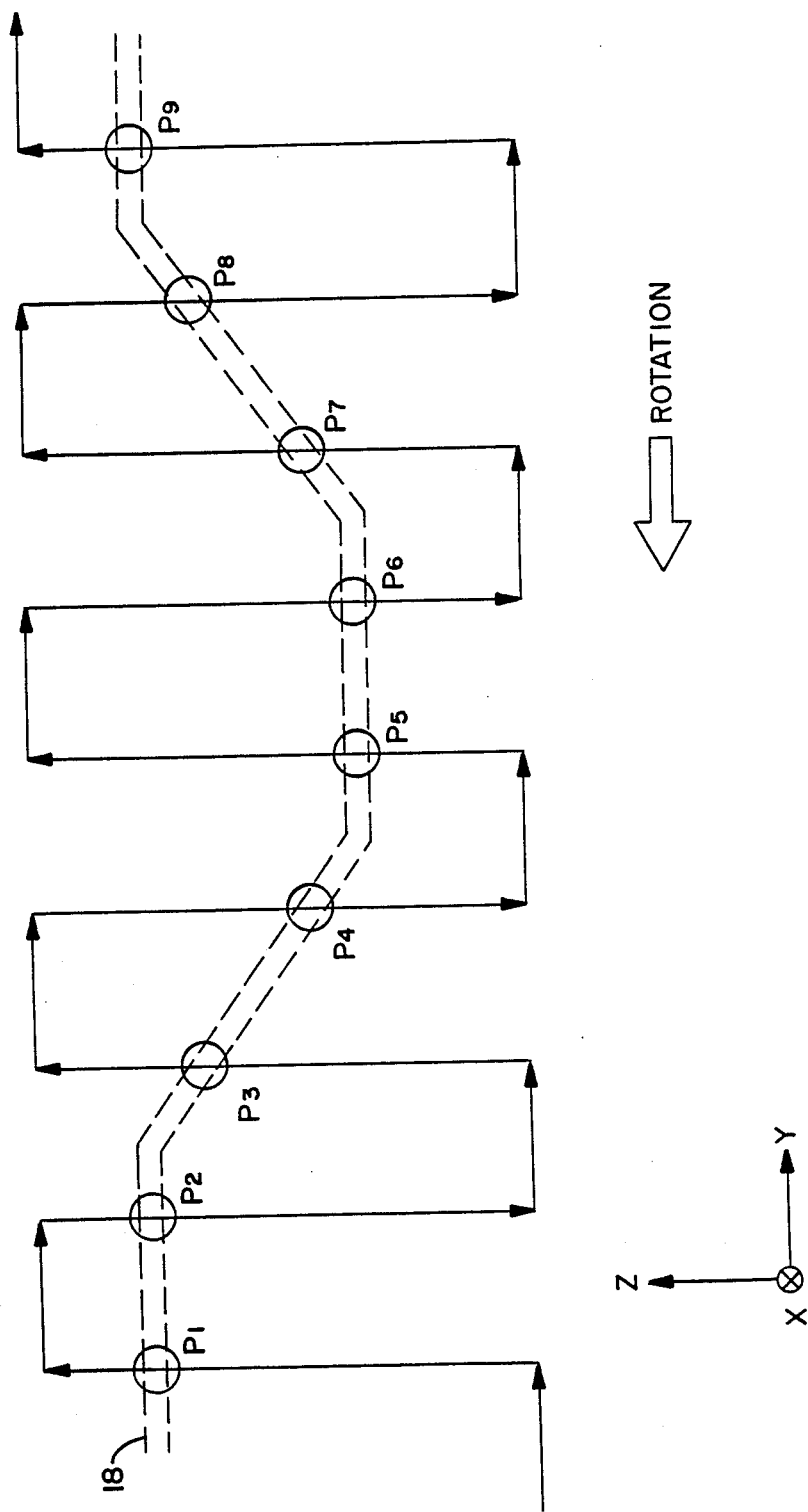
FIG. 3 is a representative view showing the operation of the invention in detecting a plurality of points along a discontinuity of the workpiece of FIG. 1.

Referring now to FIG. 3 there is shown in more detail a feature of the position determining method and apparatus of the invention. The view of FIG. 3 illustrates the apparent motion, as indicated by the connected arrows, of the eddy current probe 50 past the outer surface 16 as the workpiece 30 is rotated thereunder. Shown in dotted outline is the upstanding member 18 which is rotated past the eddy current probe, the probe being translated in an up and down fashion along the Z axis. The maximum diameter of the tip of the probe is determined in part by the size and diameter of the member 18 and also by the rotary index increment of the table 32 such that a minimum of two points (depicted as the circles $P_1$, $P_2$, etc.) are detected for each linear element of the member 18. For each passage of the probe 50 over the discontinuity resulting from the joint between member 18 and surface 14 a signal is generated by the probe which is detected by the eddy current system 52, the signal thereafter being supplied to the host CPU 36. For each signal received by the host CPU, the host CPU acquires the rotary index positional information and the Z axis encoder positional information in order to determine the position of the probe relative to the member 18 when the signal is detected. During this position determining procedure the X and Y axis position may remain unchanged. During the operation of the position determining system each of the points so detected may be stored by the host CPU 36. At the conclusion of one complete rotation of the workpiece 30 the host CPU may execute a series of program steps which are expressive of an algorithm which results in the position points P being translated into continuous linear elements or into a continuous profile curve, the coordinates of which are subsequently downloaded to the CNC system for the subsequent guiding of the welding tool over the surface. Of course, it may be desirable in some applications to determine such positional coordinates in a real-time fashion during the rotation of the workpiece 30.

Figure 4:
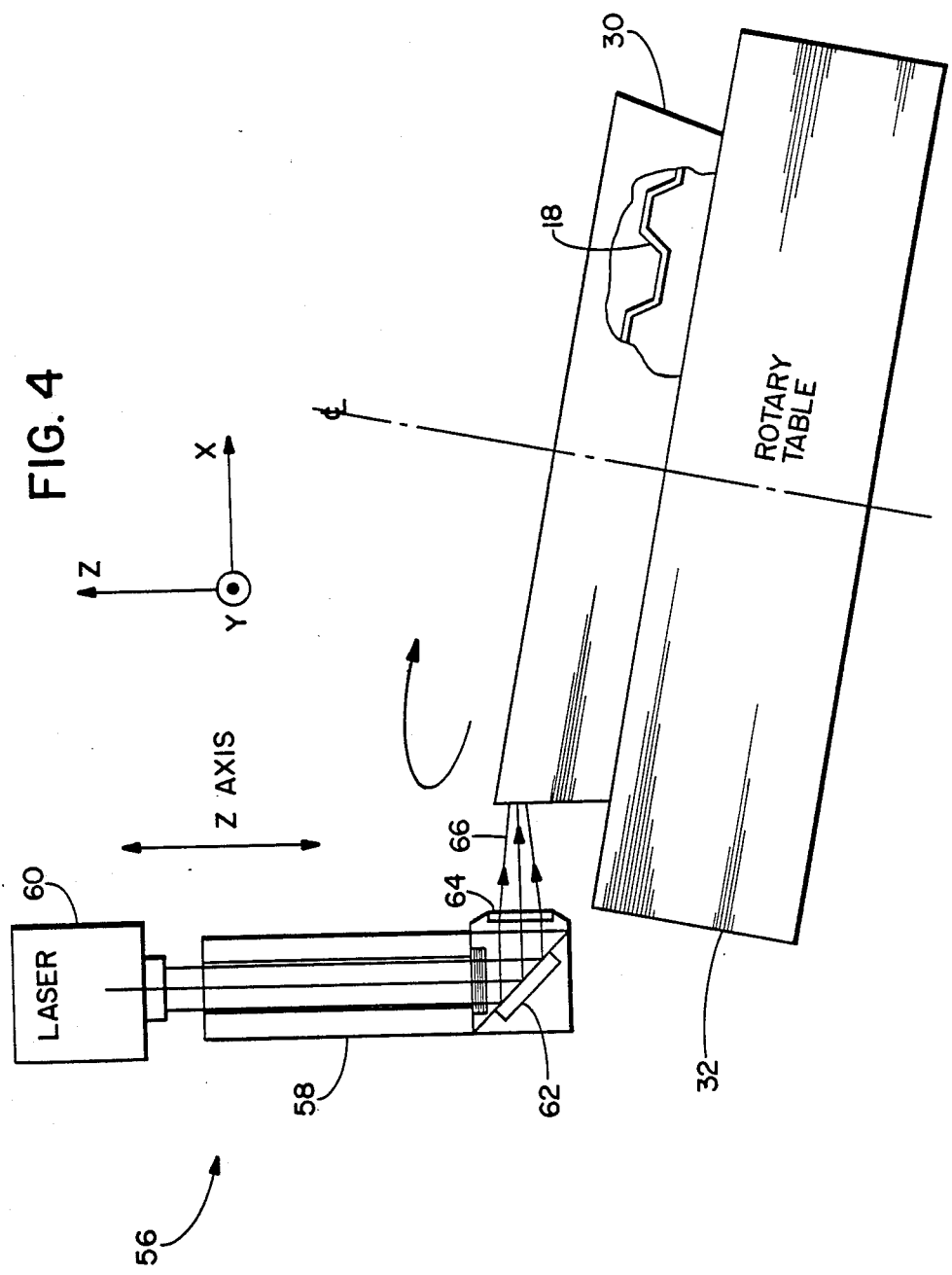
FIG. 4 is a stylized view showing the workpiece and a laser welding tool.

Referring now to FIG. 4 there is shown the rotary table 32 and the workpiece 30 attached thereto after the table 32 has been translated in the Y axis such that it is positioned adjacent to the welding tool 56. In this embodiment of the invention the welding tool 56 may comprise a beam bender 58 which couples the output laser beam from a laser 60 to the outer surface of the workpiece 30. The beam bender 58 may comprise a reflecting mirror 62 for reflecting the incident laser beam at a substantially right angle to a focussing lens 64. The lens 64 focuses the radiation beam to provide a focussed beam 66 which is applied to the surface of the workpiece 30 for heating the outer surface of the workpiece 30 such that the member 18 is welded to the inner surface of the workpiece. The laser 60 may be any type of laser having sufficient power to weld the pieces of material, such as a Nd:YAG laser operating at, for example, 400 Watts.

In accordance with the method and apparatus of the invention, the beam bender 58 is mechanically coupled to a Z axis positioning means the position of which is controlled by the coordinates previously determined by the probe 50. The rotary table 32 rotates the workpiece 30 in a substantially identical manner as to the rotation of the workpiece 30 during the eddy current positioning procedure described above. Thus, the focal point of the laser beam upon the outer surface of the workpiece 30 tracks the discontinuities previously detected by the eddy probe current 50, thus welding the member 18 to the inner surface 14 along the joint therebetween.

Of course, during the positioning determining procedure and the welding procedure the member 18 may be held engaged against the inner surface 30 of the workpiece by a suitable fixture (not shown) which is designed to immovably hold the member 18 during the positioning and subsequent welding operation.

After the member 18 has been welded to the workpiece 30 the rotary table 32 may be once more translated along the Y axis such that the rotary table 32 is once more at the coordinates where the position determining operation was performed. If desired, the eddy current probe 50 may be utilized once more to track along the previously made weld in order to test the continuity and quality of the weld. The use of eddy current probes for the testing of welds is known in the art, it being known that the presence of a weld results in a specific signal which is detected by the eddy current probe, the signal resulting from the weld differing from that of a signal generated from unwelded material. Thus, any weld imperfections or misalignments may be detected.

In summary, the invention provides for the accurate determination of the position of the member 18 relative to the inner surface of the workpiece 30 afterwhich the member 18 is welded to the inner surface of the workpiece 30 and also, if desired, the quality of this weld thereafter being determined from coordinates related to the set of coordinates which guided the welding tool. Furthermore, this weld coordinate position information may, if desired, be permanently recorded on, for example, magnetic tape or a floppy disk, depending upon the nature of the CPU 36, to provide a permanent record of the welding operation and of the integrity of the weld. Such information may be very valuable for some welding applications, such as aerospace and other types of applications where a detailed quality control record is required.

Figure 5:
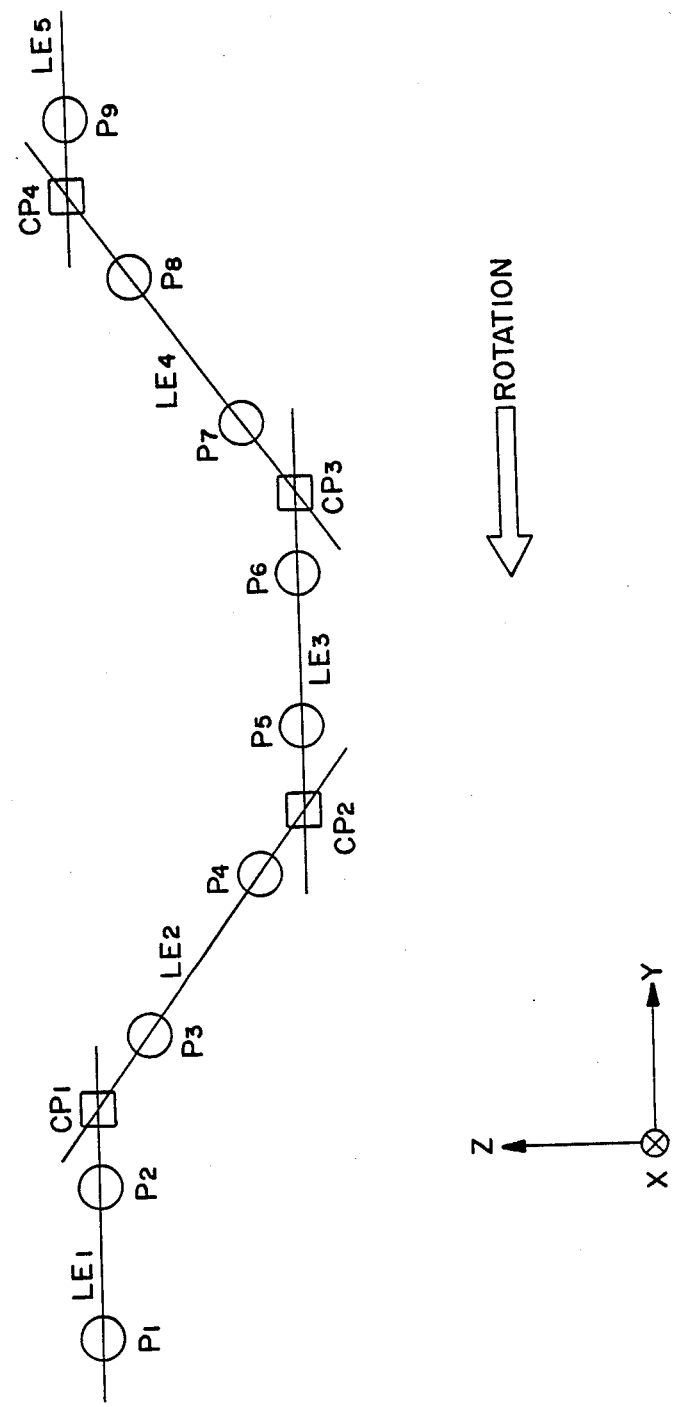
FIG. 5 is a representative view showing the operation of a discontinuity determining algorithm which is one aspect of the invention.

Referring now to FIG. 5 there is shown in graphical form one method which may be employed by the CPU 36 in determining the position of the member 18 upon the inner surface 14 of the workpiece 30. The position points $P_1$, $P_2$, etc. are the points which are detected in accordance with FIG. 3. As has been previously stated, for each signal received by CPU 36 from the eddy current system 52, the signal being indicative of a discontinuity resulting form the junction between the member 18 and the surface 14, CPU 36 determines the position of the probe 50 in the Z axis from the Z axis encoder 42. Similarly, the CPU 36 is enabled to determine the rotary position of the workpiece 30. Each of the position points so determined may be stored by the CPU 36 in an array of such points. From this stored array of points the CPU 36 is enabled to determine the relative position of the member 18 relative to the inner surface 14 of the workpiece 30.

As can be seen, the points $P_1$ and $P_2$ lie along a line element 1 ($LE_1$) which is perpendicular to the Z axis. Position points $P_3$ and $P_4$ lie along a $LE_2$ which is disposed at some angle to the Z axis, it being realized that $P_3$ and $P_4$ each have differing Z axis coordinates whereas $P_1$ and $P_2$ have substantially identical Z axis coordinates. $LE_1$ and $LE_2$ are generated by connecting adjacently disposed position points and extending the line elements connecting adjacent points such that the extended line elements intersect with one another. CPU 36 determines from the intersection of $LE_1$ and $LE_2$ a critical point ($CP_1$). The critical points $CP_2$, $CP_3$ and $CP_4$ are determined in a like manner. The critical points, in conjunction with the length of the line elements therebetween, can be seen to define the undulating shape of the member 18. As can be appreciated, the increment of rotation of the rotary table 32 is also a consideration in determining the length of each of the line elements inasmuch as the index of rotation effects the spacing between each of the points $P_1$, etc. In general, the index increment of the rotary table is preferably one half the diameter of the eddy current probe 50. For example, if the probe has a diameter of 1/16 of an inch, the preferable rotary table index per step is 1/32 of an inch.

As can be further appreciated, a minimum of two points are required to accurately generate each of the line elements. However, more than two points may be utilized if the probe has a sufficiently small diameter and if the rotary table is capable of indexing approximately one half the diameter of the probe. However, the use of two points for determining each line element has been found to give satisfactory results.

Inasmuch as during the position determining operation and the welding operation the workpiece is essentially fixed on the X and Y axes, the only two variables of motion result from the motion along the Z axis and the rotary motion of the table 32. Thus, CPU 36 is enabled to accurately determine the required motion of the welding tool 56 relative to the rotation of the rotary table 32. Each of the critical points defines a position where the welding tool is required to initiate a translation along the Z axis. For example, the position of the welding tool is maintained constant upon the Z axis for the length of $LE_1$ to the $CP_1$. At $CP_1$ the welding tool 56 is required to be translated in a downward direction along the Z axis to a Z axis position corresponding to $CP_2$. At $CP_2$ the position of the welding tool 56 along the Z axis remains constant until $CP_3$. At $CP_3$ the tool is translated in an upward direction along the Z axis until $CP_4$. Based upon this determination by CPU 36 a plurality of coordinates are generated for the CNC system which relate to the positioning of the tool in the Z axis in conjunction with the rotary motion of the table 32. This coordinate information may thereafter be utilized, as has been described, to guide the eddy current probe in a similar manner in order to test the integrity of the weld, the weld ideally being coincident with the line elements and the critical points.

The apparatus and method of the invention can be carried out by the use of an eddy current system such as one manufactured by Physical Acoustics Corporation of Irvine, CA and known as the "Smart Eddy 2.0" system. Host CPU 36 may be an ATI 2000 computer system, manufactured by Atronics International Corporation, having Compumotor PC 21 Driver/Control Interface circuit boards installed. The CNC system may be one manufactured by Anorad Corporation known as an Anomatic II. A laser operable for welding the material of workpiece 30 may be a 400 Watt Nd:YAG laser manufactured by Control Laser Corporation.

It should be realized that an illustrative embodiment of the invention has been described above and that a number of modifications and alterations to the illustrative embodiment may be envisioned by those skilled in the art. For example, the use of the invention is not limited to welding or laser welding systems but may be employed in any number of systems wherein a tool is positioned along a coordinate system and wherein a workpiece also lies within this coordinate system. It should further be realized that the use of the invention may be advantageously employed in a system wherein the eddy current probe is disposed substantially adjacent to the tool such that as the position information is obtained from the probe the tool is translated in accordance with this information to simultaneously operate upon the workpiece. Thus, it is also within the scope of the invention to provide two eddy current probes, one positioned before the tool and one positioned after the tool such that the first probe determines the position of the member to be welded relative to a workpiece, the tool welds the member along the determined position and the second probe verifies the integrity of the weld in a substantially simultaneous fashion.

Thus, the invention is not to be limited by the embodiments disclosed herein, the invention is instead intended to limited only as defined by the appended claims.

What is claimed is:

1. Apparatus for positioning a tool relative to a first surface of a workpiece, the first surface being opposite to a second surface whereon a member is to be joined to the workpiece, comprising:
   means for controllably positioning a discontinuity detection means relative to the first surface of the workpiece, the workpiece having a discontinuity between the member and the second surface, the discontinuity being detectable by said discontinuity detection means;
   means for moving said detection means relative to the first surface of the workpiece such that said detection means intersects said discontinuity at a plurality of points for producing an output signal from said detection means at each of said points;
   means for determining a position of said discontinuity being coupled to said detection means and responsive to said detection means output signal; and
   means, responsive to said position determining means, for controllably positioning a tool along the first surface relative to said discontinuity.

2. Apparatus as defined in claim 1 wherein said tool is a welding tool for welding the member to the workpiece along said discontinuity.

3. Apparatus as defined in claim 2 wherein said welding tool is a laser welding tool.

4. Apparatus as defined in claim 1 wherein said discontinuity detecting means comprises an eddy current probe detection means.

5. Apparatus as defined in claim 1 wherein said apparatus has mutually orthogonal axes associated therewith for defining a three dimensional coordinate system and wherein said apparatus further comprises:
   means for indicating a position of said detection means along one of said axes, said means for indicating having an output signal coupled to said positioning determining means, said position determining means being responsive to said indicating means output signal for determining the position of said detecting means along at least one of said axes.

6. A method for positioning a tool relative to a first surface of a workpiece, the first surface being opposite to a second surface whereon a member is to be joined to the workpiece, comprising the steps of:
   controllably positioning a discontinuity detection means relative to the first surface of the workpiece, the workpiece having a discontinuity between the member and the second surface, the discontinuity being detectable by the discontinuity detection means;
   moving the detection means relative to the workpiece such that the detection means intersects the discontinuity at a plurality of points for producing an output signal from the detection means at each of the points;
   determining a position of the discontinuity from the detection means output signals; and
   controllably positioning a tool along the first surface relative to the determined position of the discontinuity.

7. A method as defined in claim 6 wherein the step of controllably positioning a tool is accomplished by controllably positioning a welding tool along the discontinuity.

8. A method as defined in claim 7 wherein the welding tool is a laser welding tool.

9. A method as defined in claim 6 wherein the step of controllably positioning a discontinuity detection means is accomplished by controllably positioning an eddy current probe, the probe being coupled to an eddy current detection means.

10. A method as defined in claim 6 wherein the steps of controllably positioning are accomplished by controllably positioning along mutually orthogonal axes that define a three dimensional coordinate system and wherein the step of determining a position comprises the steps of: generating a position output signal for indicating the position of the detecting means relative to at least one of the axes; and
   in response to each of the generated position output signals
   recording the value of the position means output signal.

11. A method as defined in claim 10 wherein the step of controllably positioning the tool is accomplished by positioning the tool at positions related to the recorded values of the position output signal.

12. A method as defined in claim 11 wherein the step of moving the detection means relative to the workpiece comprises the steps of:
   rotating the workpiece by a predetermined increment of rotation about an axis of rotation; and
   translating the detection means along the first surface along an axis substantially parallel to the axis of rotation.

13. A welding system comprising:
   means for welding;
   means for engaging a workpiece during the welding of a member to the workpiece, the workpiece being welded from a first surface along a discontinuity between the member and the workpiece, the discontinuity being disposed along a second surface of the workpiece, the second surface being opposite the first surface;
   means for translating said welding means along the first surface relative to the discontinuity, said translating means being responsive to a controlling means for being translated in accordance with predetermined position coordinates;
   eddy current probes means having an output signal responsive to the presence of the discontinuity; and
   means for controllably translating said eddy current probe means over the second surface relative to the discontinuity, said eddy current probe translating means being responsive to said output signal for determining the position coordinates of the discontinuity.

14. A welding system as defined in claim 13 wherein said determining means comprises:
   eddy current detecting means having said output signal for indicating the presence of said discontinuity, said eddy current detecting means being coupled to said translating means;

means responsive to the translation of said detecting means for indicating the positional coordinates of said detecting means; and means coupled to said output signal and to said indicating means for receiving said signal and for recording the positional coordinates of said detecting means when said output signal is received.

15. A system as defined in claim 14 and further comprising:

means responsive to said receiving and recording means for translating said welding means relative to the second surface in accordance with said recorded positional coordinates whereby the workpiece is welded along the discontinuity to form a weld joint.

16. A system as defined in claim 15 wherein said engaging means comprises means for controllably rotating the second surface of the workpiece past said eddy current probe detecting means.

17. A system as defined in claim 16 and further comprising:

second eddy current probe detecting means having an output signal responsive to the weld joint for determining the quality of the weld joint;

means for translating said second eddy current probe detecting means along the second surface relative to the weld joint; and means responsive to said recorded positional coordinates for driving said second eddy current probe translating means such that said second eddy current probe detecting means is translated along the weld joint.

18. In a welding system, a method of determining the position of a discontinuity between a first member and a second substantially planar member which are to be welded together along the discontinuity, the first member being disposed substantially adjacent to a top surface of the second member, comprising the steps of:

controllably translating a discontinuity detecting means over a bottom surface of the second member such that the detecting means intersects the discontinuity at a plurality of points;

detecting an output signal from the detecting means, the signal being generated by the detecting means in response to the detecting means intersecting the discontinuity;

recording the position of the detecting means relative to the bottom surface each time the output signal is detected, each recorded position defining a point on the bottom surface;

connecting a set of two or more substantially adjacent points with a line element drawn through the substantially adjacent points;

extending each of the line elements such that line elements from adjacent sets of points intersect, the intersection defining the position of a critical point; and determining the position of the discontinuity as being defined by that portion of the intersecting line elements between the critical points.

19. A method as defined in claim 18 wherein the first member is disposed substantially perpendicular to the top surface of the second member.

20. A method as defined in claim 18 wherein the detecting means is translated along a first axis and wherein the bottom surface is translated along a second axis substantially orthogonal to said first axis.

21. A method as defined in claim 20 wherein said first axis is a Z axis and wherein the bottom surface is rotated past the detecting means.

22. A method as defined in claim 18 and further comprising the step of:

translating a welding tool along the bottom surface of the second member in accordance with the determined position of the joint, the welding tool welding the first member to the second member along the discontinuity between the two members.

23. A method as defined in claim 18 wherein the detecting means comprises an eddy current probe coupled to an eddy current detection means.

* * * * *